US006654530B1

United States Patent
Mueller-Fiedler et al.

(10) Patent No.: US 6,654,530 B1
(45) Date of Patent: Nov. 25, 2003

(54) INTEGRATED OPTICAL WAVEGUIDE

(75) Inventors: Roland Mueller-Fiedler, Leonberg (DE); Winfried Bernhard, Gerlingen (DE); Lutz Mueller, Gerlingen (DE); Oliver Roesch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/890,092

(22) PCT Filed: Jan. 21, 2000

(86) PCT No.: PCT/DE00/00172

§ 371 (c)(1),
(2), (4) Date: Oct. 30, 2001

(87) PCT Pub. No.: WO00/45204

PCT Pub. Date: Aug. 3, 2000

(30) Foreign Application Priority Data

Jan. 28, 1999 (DE) .......................................... 199 04 304

(51) Int. Cl.⁷ ............................... G02B 6/02; G02B 6/16
(52) U.S. Cl. ........................ 385/123; 385/129; 385/143; 385/145
(58) Field of Search ................................ 385/123, 129, 385/130, 131, 132, 143, 145

(56) References Cited

U.S. PATENT DOCUMENTS 5,966,490 A  * 10/1999  Minns ......................... 385/127
6,002,823 A  * 12/1999  Chandross .................... 385/50

FOREIGN PATENT DOCUMENTS

| DE | 196 34 780 | 3/1998 |
| EP | 0 375 178 | 6/1990 |
| EP | 0375178 B1 * | 3/1996 |
| EP | 0 752 598 | 1/1997 |
| EP | 0 862 070 | 9/1998 |

OTHER PUBLICATIONS

Knoche et al., "Low Loss Polymer Waveguides at 1300 and 1550NM Using Halogenated Acrylates", Electronics Letters, GB, IEE Stevenage, vol. 32, No. 14, Jul. 4, 1996, pp. 1284–1285.
N. Keil et al., "A Novel Type of 2x2 Digital Optical Switch Realized by Polymer Waveguide Technology", 1996, ECOC Oslo.
T.Knoche et. al., "Low loss polymer waveguides at 1300 and 1550 nm using halogenated acrylates", Electronics Letters 32(14), pp. 1284–1285(1996).*
S.V.Gangal, "Perfluorinated polymers, Tetrafluoroethylene–Perfluorodioxole coplymers", Encyclopedia of Polymer Science and Technology, Wiley, Online Posting.*

* cited by examiner

Primary Examiner—John Juba
Assistant Examiner—Leo Boutsikaris
(74) Attorney, Agent, or Firm—Kenyon & Kenyon

(57) ABSTRACT

An optical waveguide is described which has a core and a sheath, each of which is made of a fully fluorinated fluorocarbon material. In particular, a fully fluorinated Teflon material such as Teflon AF 1600 or Teflon AF 2400, or a mixture thereof, is suitable as the fully fluorinated fluorocarbon. The optical waveguide is optically transparent around the 1300 nm and/or 1550 nm wave band. Furthermore, the core of the optical waveguide may have a refractive index that is higher than the refractive index of the sheath. The optical waveguide is suitable for use as, for example, an integrated optical waveguide for transmitting information in optical telecommunications.

5 Claims, 1 Drawing Sheet

INTEGRATED OPTICAL WAVEGUIDE

FIELD OF THE INVENTION

The present invention relates to an integrated optical waveguide.

BACKGROUND INFORMATION

Conventional integrated optical waveguides have a core and/or sheath made of polymers. However, to use a waveguide of this type in optical telecommunications, the waveguide must have high transparency and low attenuation in the two known optical windows on the 1300 nm and 1550 nm wave bands.

Due to absorption caused by excited molecular harmonics, however, the C—H and O—H groups contained in many polymers produce substantial, unwanted optical attenuation in conventional optical waveguides on these wave bands.

The use of Teflon AF 1600, which is manufactured and sold by DuPont, Specialty Polymers, P.O. Box 80713, Wilmington, Del., 19880, USA, as the upper buffer for waveguides is described in N. Keil, H. Yao and C. Zawadzki, "A Novel Type of 2×2 Digital Optical Switch Realized by Polymer Waveguide Technology" 1996, ECOC Oslo.

SUMMARY

An integrated optical waveguide according to an example embodiment of the present invention has the advantage that the use of fully fluorinated fluorocarbon materials can easily and economically realize highly transparent optical waveguides with very low attenuation in the windows around 1300 nm and 1550 nm that are so important for optical telecommunications.

Complete replacement of light-weight hydrogen atoms with the heavier fluorine achieves a much lower optical attenuation in these materials, compared to conventional polymers, making the optical waveguides according to the example embodiment of the present invention extremely suitable for transmitting information in optical telecommunications.

The core and sheath of the optical waveguide are each very advantageously made of a fully fluorinated Teflon material, for which purpose the Teflon AF 1600 and Teflon AF 2400 materials are especially suitable and, in addition, mix well and are easy to process. As a result, both the core and the, sheath of the optical waveguide can be advantageously composed of a mixture of fully fluorinated Teflon materials. To avoid intensity losses, the refractive index of the core is higher than the refractive index of the sheath.

DETAILED DESCRIPTION

Figure 1:
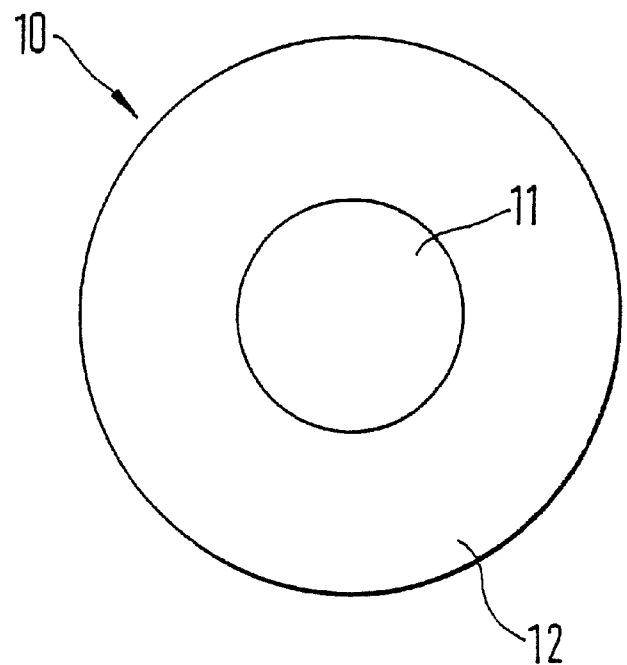
FIG. 1 and FIG. 2 each show a cross-section of an optical waveguide according to the present invention.

FIG. 1 shows a cross-section of an optical waveguide 10 that has a core 11 and a sheath 12 surrounding core 11. Core 11 is made of Teflon AF 1600 from DuPont, a material that has a refractive index of $n_b=1.31$. The sheath is made of Teflon AF 2400 from DuPont, a material that has a refractive index of $n_b=1.29$. Both Teflon materials are fully fluorinated and, in particular, do not contain any hydrogen atoms.

Optical waveguide 10 is optically transparent around the 1300 nm wave band (from approximately 1250 nm to approximately 1350 nm) and around the 1550 nm wave band (from approximately 1480 nm to approximately 1600 nm), making it especially suitable for use as an integrated optical waveguide for transmitting information in optical telecommunications.

The Teflon AF 1600 and Teflon AF 2400 materials can be mixed together, which means that nearly any refractive index between 1.29 and 1.31 can be produced by mixing. According to a further embodiment of the present invention, core 11 is made of a mixture of Teflon AF 1600 and AF 2400 and is surrounded by a sheath 12 that is made of Teflon AF 2400.

According to a third embodiment, core 11 and sheath 12 are both made of a mixture of Teflon AF 1600 and Teflon AF 2400, with these mixtures being selected so that the refractive index of core 11 is higher than the refractive index of sheath 12.

Figure 2:
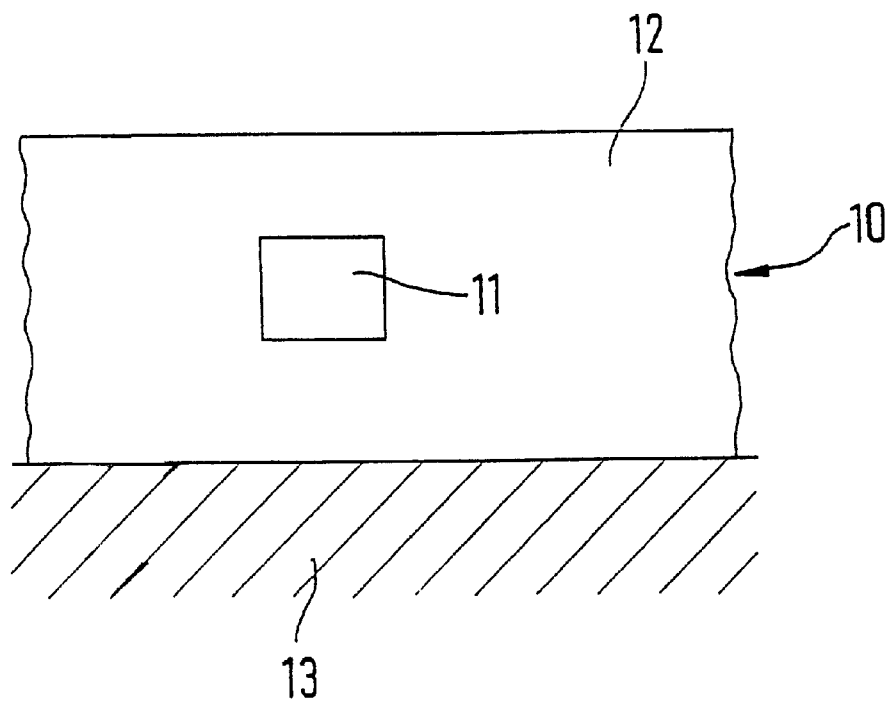

However, the design of the present invention is not limited to the two Teflon materials mentioned above. Thus, a wide range of combinations with other fully fluorinated fluorocarbon materials is possible. In particular, optical waveguide 10 can also have the design illustrated in FIG. 2, with the composition of core 11 and sheath 12 being designed according to one of the embodiments described above. As shown in FIG. 2, a thin layer is applied to a substrate 13 to form sheath 12, a conventional production method, with core 11 passing through the interior of sheath 12.

What is claimed is:

1. An optical waveguide, comprising:
    a core; and
    a sheath surrounding the core, the core and the sheath each composed of a fully fluorinated fluorocarbon, wherein the core is composed of at least one of TEFLON AF 1600 fluoropolymer and a mixture of TEFLON AF 1600 fluoropolymer and TEFLON AF 2400 fluoropolymer, and the sheath is composed of one of TEFLON AF 2400 fluoropolymer and a mixture of TEFLON AF 1600 fluoropolymer and TEFLON AF 2400 fluoropolymer.

2. The optical waveguide according to claim 1, wherein the fluorocarbon is a fully fluorinated TEFLON fluoropolymer material.

3. The optical waveguide according to claim 1, wherein the optical waveguide is optically transparent around at least one of a 1300 nm and a 1550 nm wave band.

4. The optical waveguide according to claim 1, wherein a refractive index of the core is higher than a refractive index of the sheath.

5. A method of transmitting information in optical communications, comprising:
    providing an integrated optical waveguide, including a core and a sheath, the core and the sheath each composed of a fully fluorinated fluorocarbon; and transmitting information using the integrated optical waveguide, wherein the core is composed of at least one of TEFLON AF 1600 fluoropolymer and a mixture of TEFLON AF 1600 fluoropolymer and TEFLON AF 2400 fluoropolymer, and the sheath is composed of one of TEFLON AF 2400 fluoropolymer and a mixture of TEFLON AF 1600 fluoropolymer and TEFLON AF 2400 fluoropolymer.

* * * * *